(12) United States Patent
Sagara et al.

(10) Patent No.: US 12,663,869 B2
(45) Date of Patent: Jun. 23, 2026

(54) INPUT DEVICE

(71) Applicant: Panasonic Automotive Systems Co., Ltd., Kanagawa (JP)

(72) Inventors: Hisashi Sagara, Osaka (JP); Hideaki Eto, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 29 days.

(21) Appl. No.: 18/749,221

(22) Filed: Jun. 20, 2024

(65) Prior Publication Data

US 2025/0004560 A1 Jan. 2, 2025

(30) Foreign Application Priority Data

Jun. 29, 2023 (JP) ................................. 2023-107527

(51) Int. Cl.
| | |
|---|---|
| *G06F 3/01* | (2006.01) |
| *B60K 35/10* | (2024.01) |
| *B60K 35/25* | (2024.01) |
| *G06F 3/041* | (2006.01) |
| *B60K 35/26* | (2024.01) |

(52) U.S. Cl.
CPC .............. *G06F 3/016* (2013.01); *B60K 35/10* (2024.01); *B60K 35/25* (2024.01); *G06F 3/0414* (2013.01); *B60K 35/26* (2024.01); *G06F 2203/04106* (2013.01)

(58) Field of Classification Search
CPC ................... G06F 3/016; G06F 3/0414; G06F 2203/04106; B60K 35/10; B60K 35/25; B60K 35/26
See application file for complete search history.

(56) References Cited

U.S. PATENT DOCUMENTS

| | | | |
|---|---|---|---|
| 2006/0119573 A1* | 6/2006 | Grant ...................... | G06F 3/016 |
| | | | 345/156 |
| 2010/0225604 A1* | 9/2010 | Homma .................. | G06F 3/044 |
| | | | 345/173 |
| 2015/0097791 A1 | 4/2015 | Lisseman et al. | |
| 2015/0097793 A1 | 4/2015 | Lisseman et al. | |
| 2015/0097794 A1 | 4/2015 | Lisseman et al. | |
| 2015/0097795 A1 | 4/2015 | Lisseman et al. | |
| 2015/0097796 A1 | 4/2015 | Lisseman et al. | |
| 2018/0074676 A1* | 3/2018 | Lee ...................... | G06F 3/04842 |
| 2018/0203511 A1 | 7/2018 | Lisseman et al. | |
| 2018/0335845 A1* | 11/2018 | Matsunami ......... | G06F 3/03547 |
| 2020/0371629 A1* | 11/2020 | Hauenstein ........... | G06F 3/0412 |
| 2021/0173509 A1* | 6/2021 | Tanaka .................. | G06F 3/0416 |
| 2024/0115937 A1* | 4/2024 | Bean ...................... | A63F 13/79 |

FOREIGN PATENT DOCUMENTS

JP 2020064649 A 4/2020

* cited by examiner

*Primary Examiner* — Patrick N Edouard
*Assistant Examiner* — Joseph P Fox
(74) *Attorney, Agent, or Firm* — Seed Intellectual Property Law Group LLP

(57) ABSTRACT

An input device to be provided in a vehicle includes: an electrostatic sensor that detects the contact position of an operating body on an operation surface; a pressure detector that detects pressure applied to the operation surface; an exciter that vibrates the operation surface; and a controller. The controller causes the exciter to output at least one of sound or vibration based on a signal in accordance with the detection performed by the electrostatic sensor and a signal in accordance with the detection performed by the pressure detector.

19 Claims, 7 Drawing Sheets

INPUT DEVICE

CROSS REFERENCE TO RELATED APPLICATION

The present application is based on and claims priority of Japanese Patent Application No. 2023-107527 filed on Jun. 29, 2023.

FIELD

The present disclosure relates to input devices.

BACKGROUND

Patent Literature (PTL) 1 discloses a pressure-sensitive haptic human machine interface including a touch plate having a touch surface, an actuator configured to transmit a mechanical output to the touch plate, at least one pressure-sensitive sensor configured to detect pressure applied to the touch surface, and a processing device that detects at least part of vibration of the human machine interface based on the pressure detected by the at least one pressure-sensitive sensor.

CITATION LIST

Patent Literature

PTL 1: Japanese Unexamined Patent Application Publication No. 2020-64649

SUMMARY

However, the pressure-sensitive haptic human machine interface according to the aforementioned PTL 1 can be improved upon.

In view of this, the present disclosure provides an input device capable of improving upon the above related art.

An input device according to one aspect of the present disclosure is to be provided in a vehicle and includes: an electrostatic sensor that detects the contact position of an operating body on an operation surface; a pressure detector that detects pressure applied to the operation surface; an exciter that vibrates the operation surface; and a controller. The controller causes the exciter to output at least one of sound or vibration based on a signal in accordance with the detection performed by the electrostatic sensor and a signal in accordance with the detection performed by the pressure detector.

The input device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

The embodiment described below illustrates a general or specific example. The numerical values, shapes, materials, elements, and the arrangement and connectivity of the elements, etc., given in the following embodiment are examples, and are not intended to limit the present disclosure. Among elements described in the following embodiment, those not described in any of the independent claims are presented as optional elements.

The expressions such as "in an X-axis direction", "substantially parallel", and "plate-like shape" are used in the following embodiment. For example, "in an X-axis direction" does not only mean "perfectly in X-axis direction" but also means "approximately in X-axis direction", "substantially parallel" does not only mean "perfectly parallel" but also means "substantially parallel", and "plate-like shape" does not only mean "being perfectly a plate" but also means "being substantially a plate". In other words, each of the expressions includes a difference of approximately few percents. The expression "in an X-axis direction", "substantially parallel", or "plate-like shape" has a meaning within a range in which the present disclosure produces effects. The same applies to other expressions using "direction", "substantially", and "-like".

In the following embodiment, a direction from a circuit substrate to an electrostatic sensor is defined as an X-axis positive direction, one of longitudinal directions of the circuit substrate is defined as a Y-axis positive direction, and one of directions perpendicular to the X-axis positive direction and the Y-axis positive direction is defined as a Z-axis positive direction. A direction opposite to the X-axis positive direction is defined as an X-axis negative direction, a direction opposite to the Y-axis positive direction is defined as a Y-axis negative direction, and a direction opposite to the Z-axis positive direction is defined as a Z-axis negative direction.

The figures are schematic diagrams and are not necessarily precise illustrations. In the figures, like components share like reference signs.

Hereinafter, an embodiment will be described in detail with reference to the drawings.

EMBODIMENT

Configuration and Functions

First, the configuration of input device 1 will be described with reference to FIG. 1 through FIG. 9.

Figure 1:
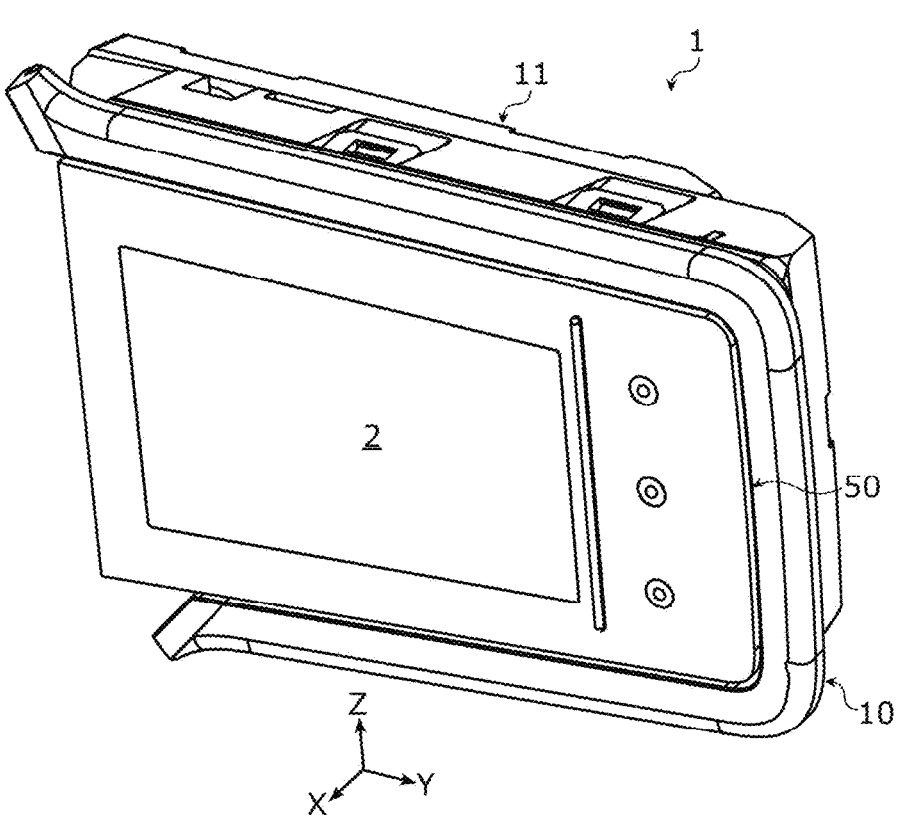
FIG. 1 is a perspective view of an input device according to an embodiment.
Figure 2:
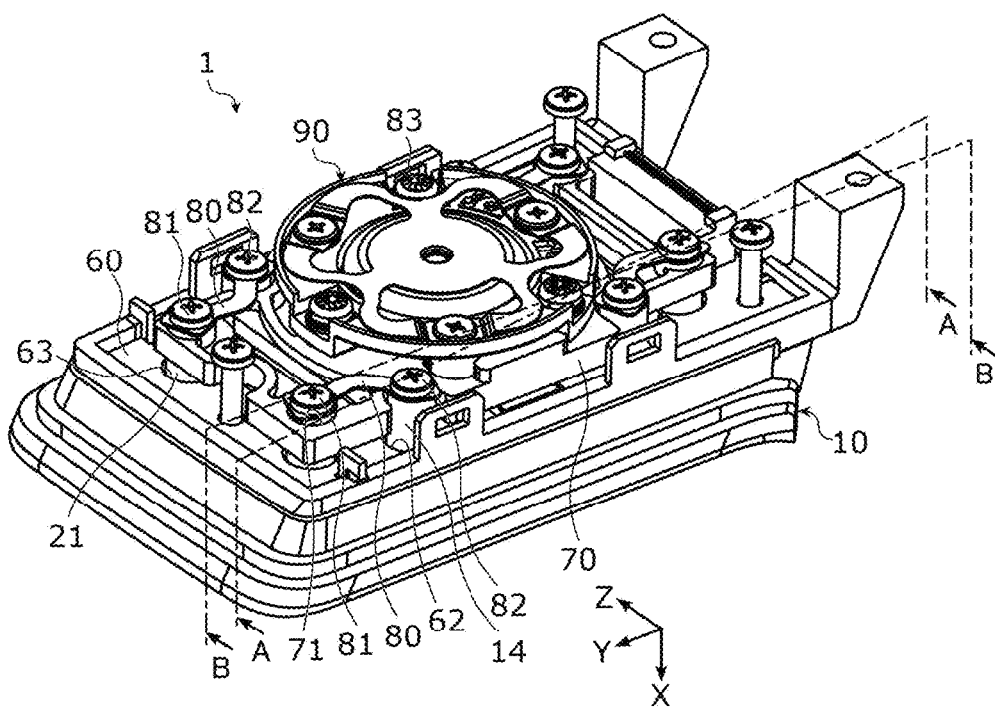
FIG. 2 is a perspective view illustrating the exciter side of the input device according to an embodiment.
Figure 3:
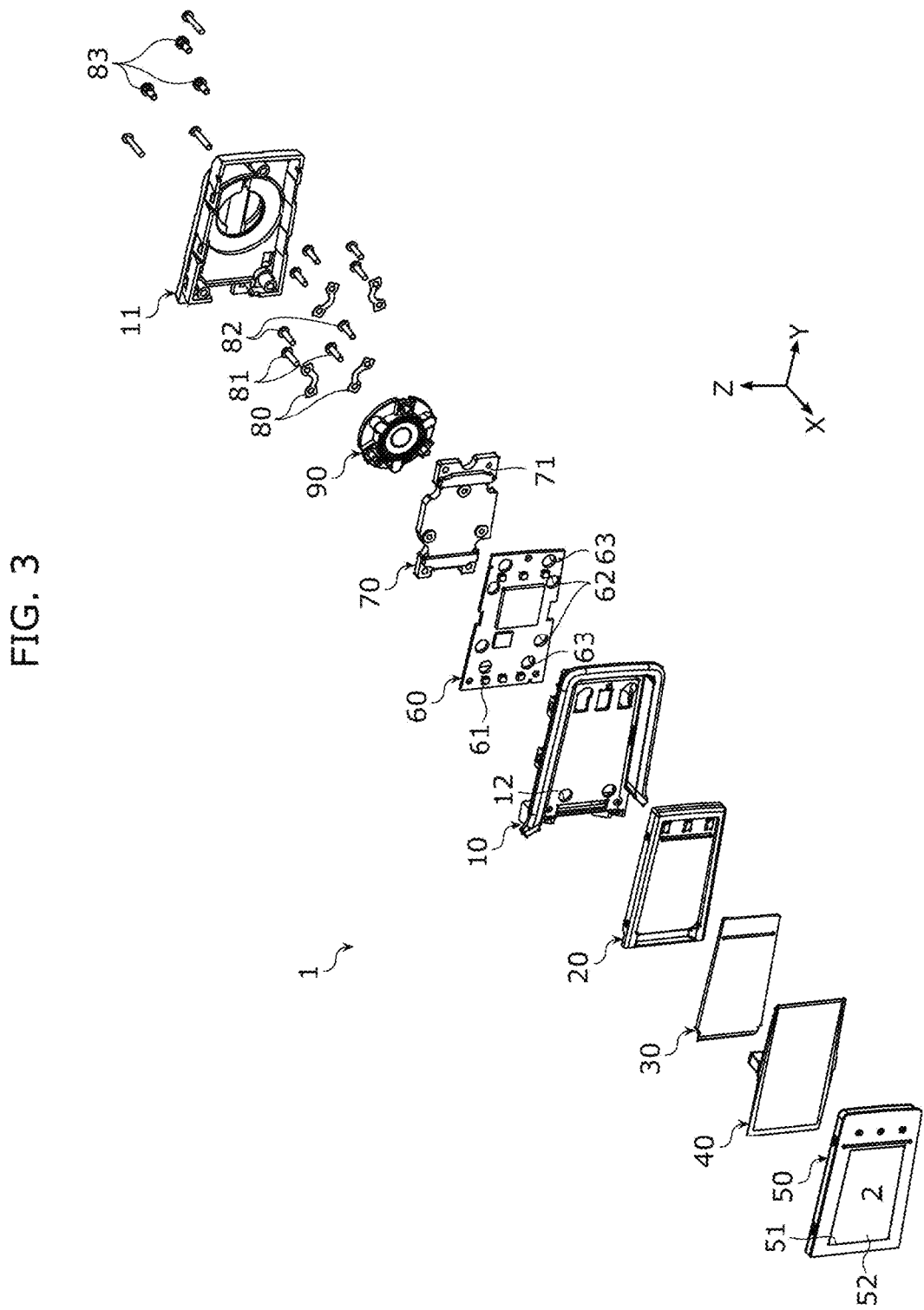
FIG. 3 is an exploded perspective view of the input device according to an embodiment.
Figure 4:
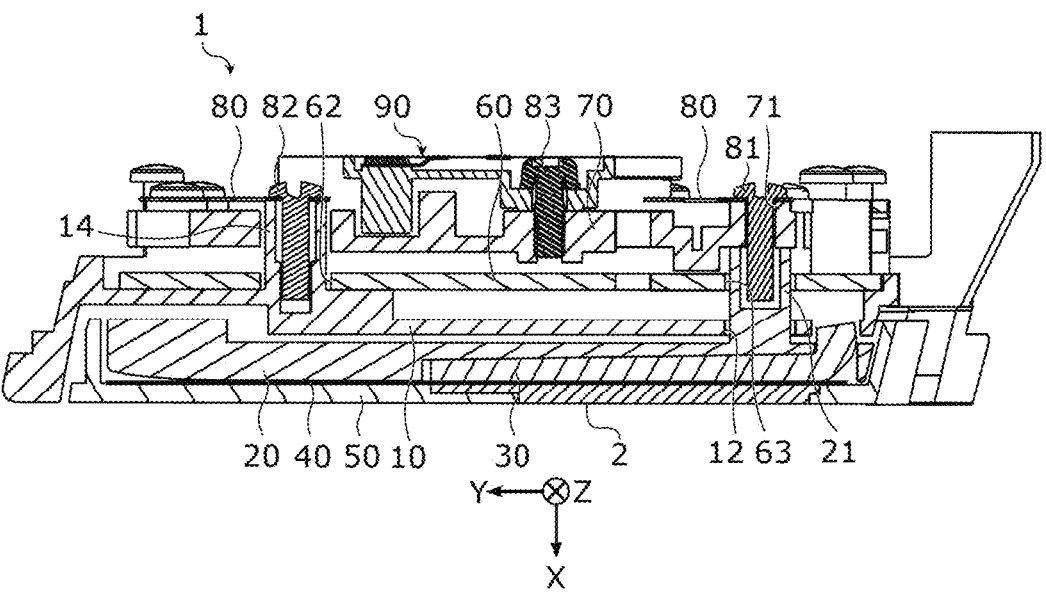
FIG. 4 is a cross-sectional view of the input device taken at line A-A in FIG. 2.
Figure 5:
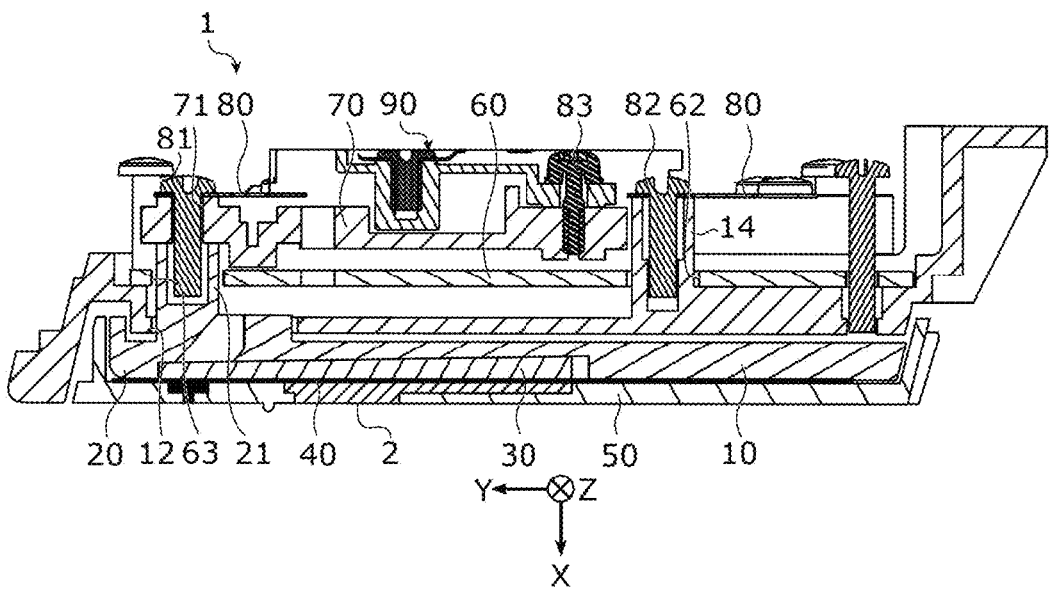
FIG. 5 is a cross-sectional view of the input device taken at line B-B in FIG. 2.
Figure 6:
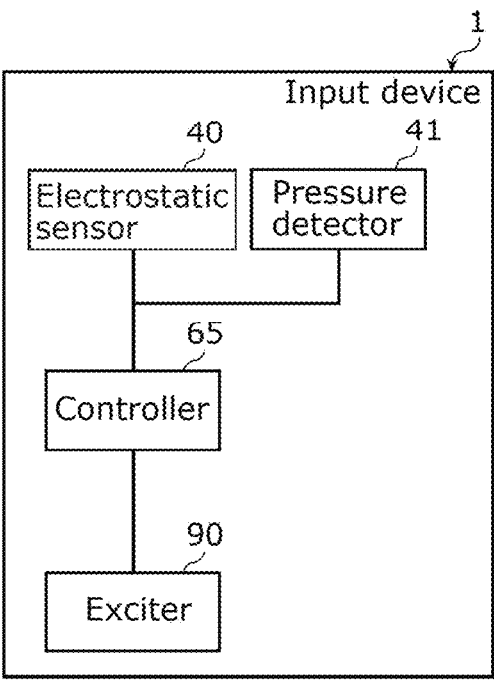
FIG. 6 is a block diagram illustrating the input device according to an embodiment.
Figure 7:
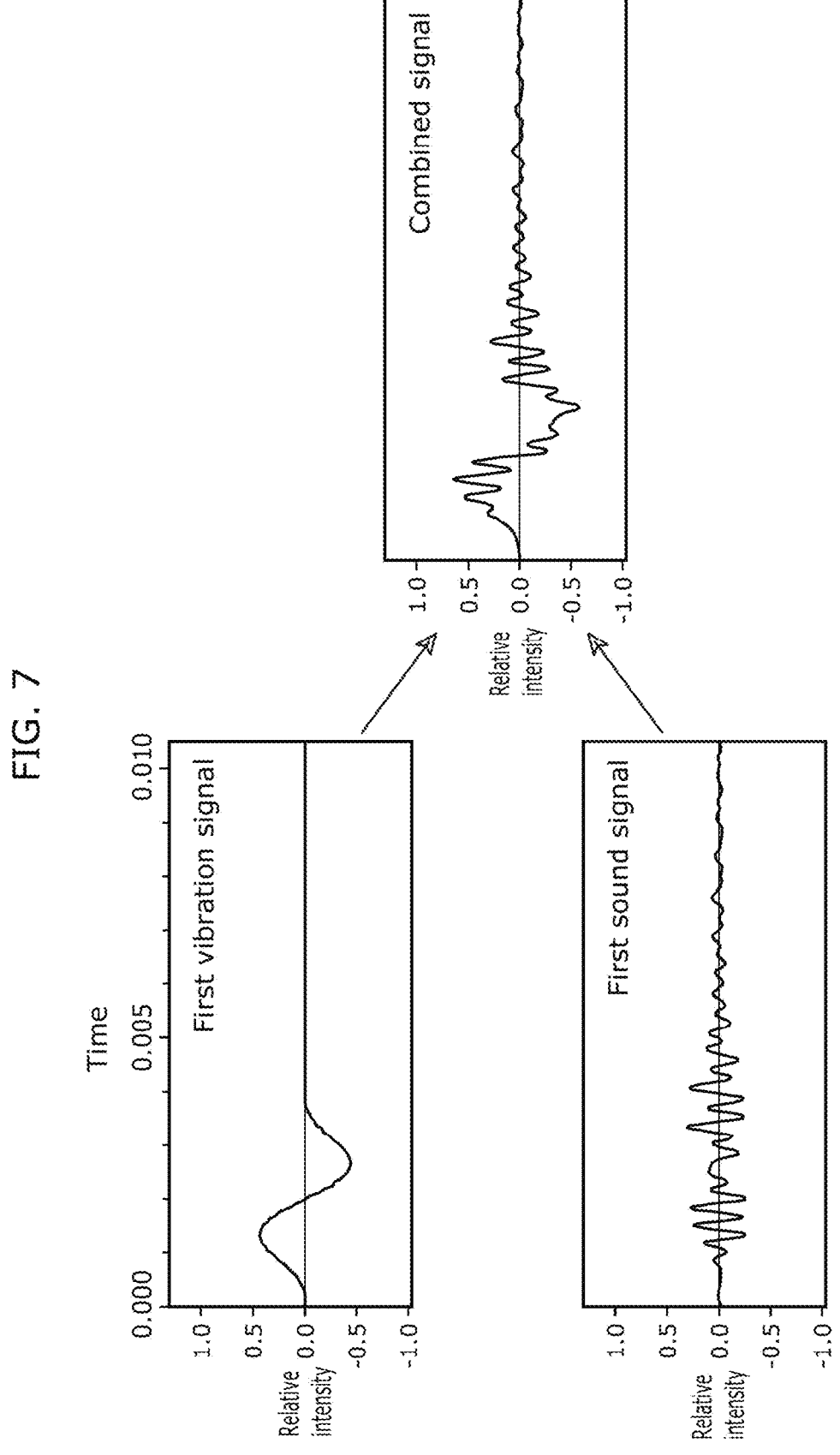
FIG. 7 is a diagram illustrating a combined signal obtained by combining a vibration signal and a sound signal.
Figure 8:
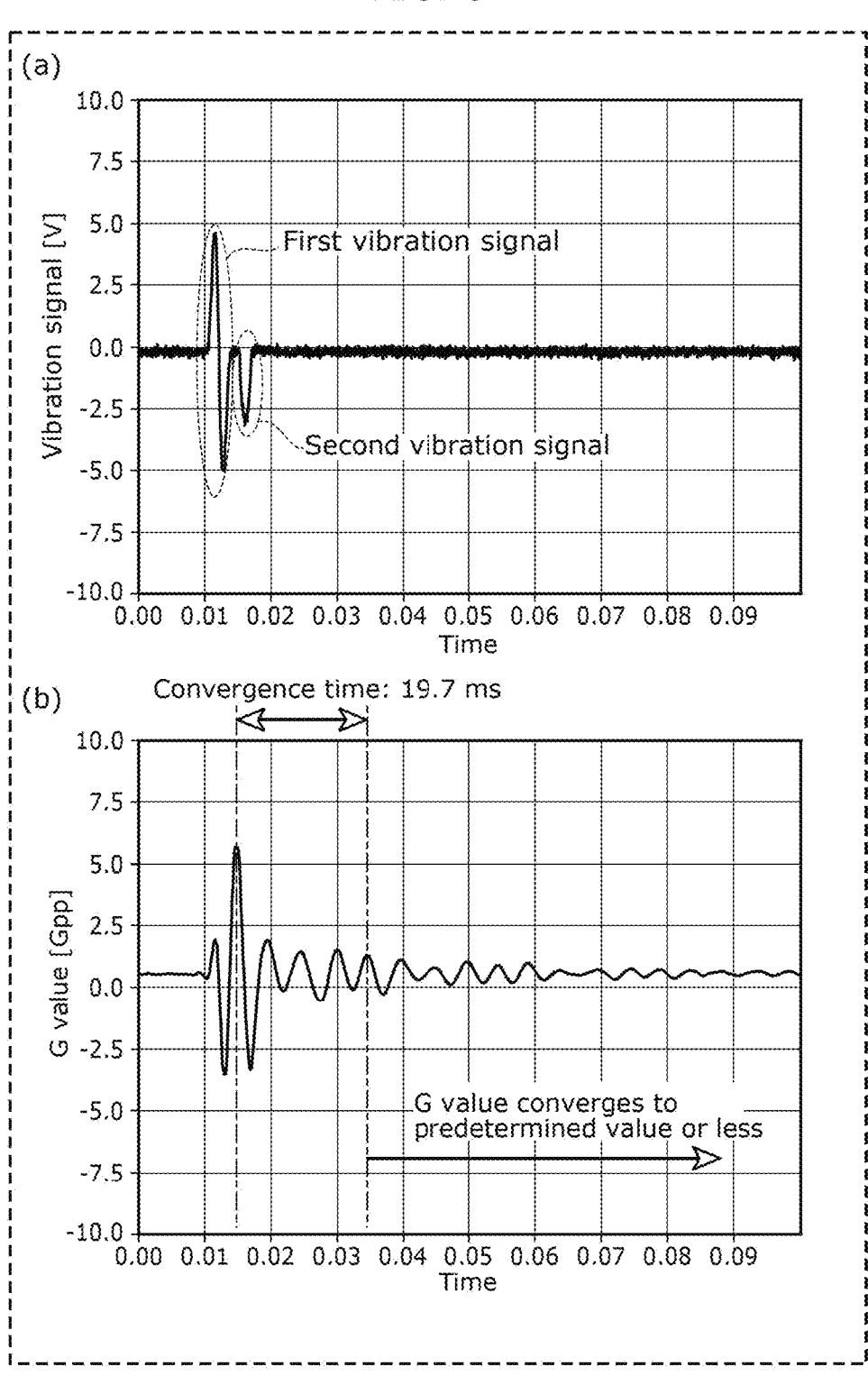
FIG. 8 is a diagram illustrating input signals of the input device and a G value.
Figure 9:
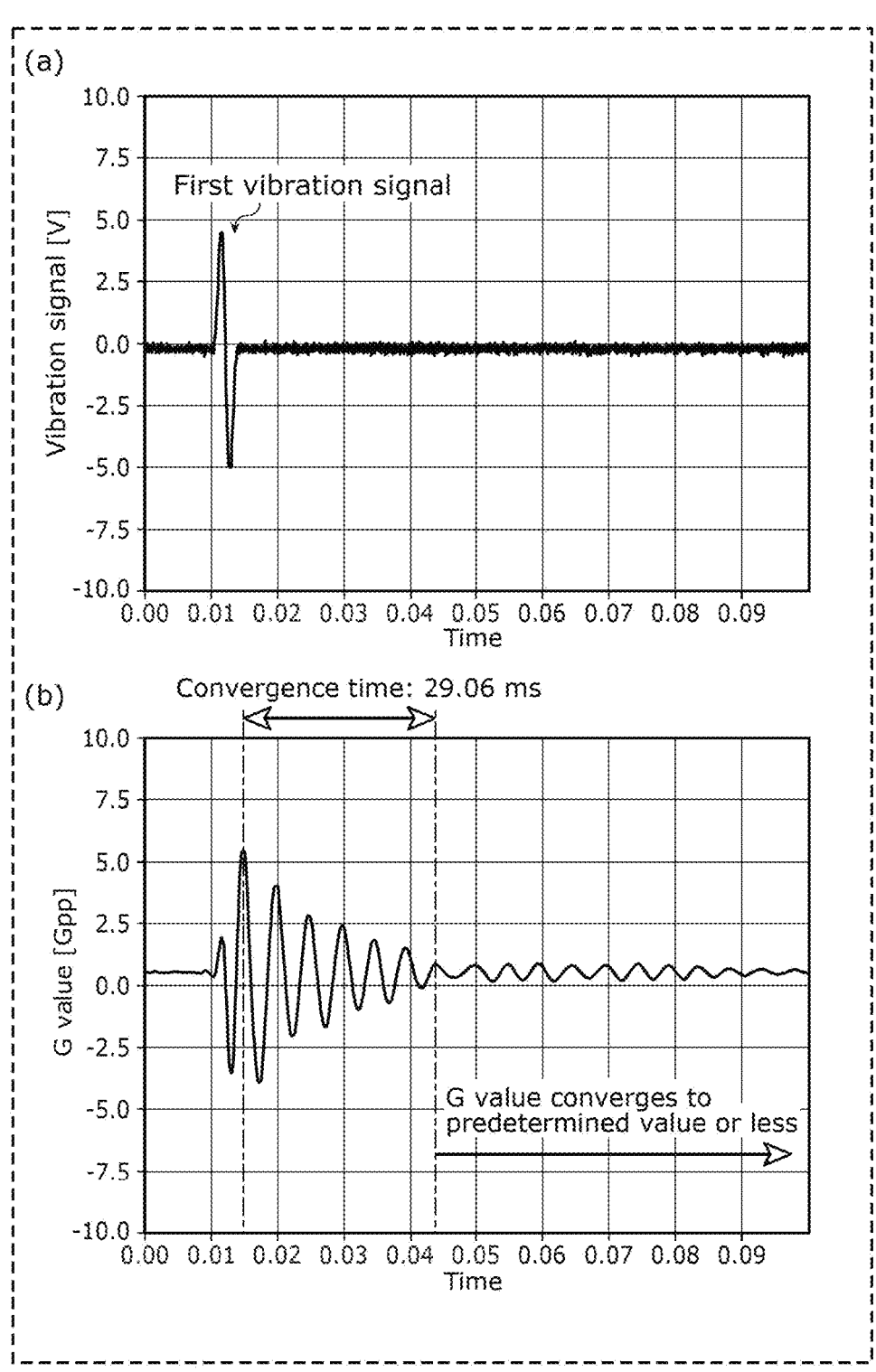
FIG. 9 is another diagram illustrating an input signal of the input device and a G value.

FIG. 1 is a perspective view of input device 1 according to an embodiment. FIG. 2 is a perspective view illustrating the exciter 90 side of input device 1 according to an embodiment. FIG. 3 is an exploded perspective view of input device 1 according to an embodiment. FIG. 4 is a cross-sectional view of input device 1 taken at line A-A in FIG. 2. FIG. 5 is a cross-sectional view of input device 1 taken at line B-B in FIG. 2. FIG. 6 is a block diagram illustrating input device 1 according to an embodiment. FIG. 7 is a diagram illustrating a combined signal obtained by combining a vibration signal and a sound signal. FIG. 8 is a diagram illustrating input signals of input device 1 and a G value. (a) in FIG. 8 illustrates a relationship between vibration signals (a first vibration signal and a second vibration signal) to be input to exciter 90 and time. (b) in FIG. 8 illustrates a relationship between a G value in a movable portion and time. FIG. 9 is another diagram illustrating an input signal of input device 1 and a G value. In FIG. 2, FIG. 4, and FIG. 5, the illustration of cover 11 is omitted. (a) in FIG. 9 illustrates a relationship between a vibration signal (the first vibration signal) to be input to exciter 90 and time. (b) in FIG. 9 illustrates a relationship between a G value in a movable portion and time.

As illustrated in FIG. 1, input device 1 detects an operation that is an input operation performed on operation surface 2 by an operating body, and causes operation surface 2 to vibrate or output sound in accordance with the detected operation. Operation surface 2 as used herein is a single operation surface. Input device 1 is provided in a place such as a spoke of a steering wheel or in a center console in the compartment of a vehicle.

An operating body is, for example, a finger of a user in a vehicle or a touch pen operated by the user. The operation includes a push operation and a trace operation. The trace operation includes a swipe operation and a flick operation. The push operation is an operation in which the operating body presses operation surface 2 of input device 1. The swipe operation is an operation of moving the operating body along operation surface 2 while the operating body is contacting operation surface 2. The flick operation is an operation in which the operating body moves along operation surface 2 with more speed than the swipe operation while the operating body is contacting operation surface 2, and the operating body moves away from operation surface 2. Input device 1 can determine which of a swipe operation and a flick operation has been performed, based on distance and time that the operating body moves on operation surface 2.

Hereinafter, the detailed configuration of input device 1 will be described.

As illustrated in FIG. 2 to FIG. 4, input device 1 includes main body 10, cover 11, slider 20, light diffusion sheet 30, electrostatic sensor 40, panel 50, circuit substrate 60, holder 70, leaf spring 80, and exciter 90.

Main body 10 is a flat container and is disposed to have an orientation substantially parallel to the Z-Y plane. Main body 10 accommodates slider 20, light diffusion sheet 30, electrostatic sensor 40, and panel 50.

Cover 11 is disposed on the X-axis negative direction side of main body 10 to have an orientation substantially parallel to the Z-Y plane. Cover 11 is coupled to main body 10. Cover 11 is a flat container and accommodates circuit substrate 60, holder 70, leaf spring 80, and exciter 90.

Slider 20 has a plate-like shape and is disposed in main body 10 to have an orientation substantially parallel to the Z-Y plane. Slider 20 holds light diffusion sheet 30 on the surface on a side opposite to the main body 10 side.

Light diffusion sheet 30 is a light guide held by slider 20 on the X-axis positive direction side of slider 20 to have an orientation substantially parallel to the Z-Y plane. Light diffusion sheet 30 is disposed so that a part of light diffusion sheet 30 faces light sources 61 of circuit substrate 60 with slider 20 and main body 10 interposed between light diffusion sheet 30 and light sources 61. Accordingly, by guiding light emitted by each of light sources 61 mounted on circuit substrate 60, light diffusion sheet 30 can emit light from the surface on the X-axis positive direction side.

Electrostatic sensor 40 is disposed to cover light diffusion sheet 30. Electrostatic sensor 40 is disposed on a plane on the X-axis positive direction side of light diffusion sheet 30 and slider 20, interposed between (i) panel 50 and (ii) slider 20 and light diffusion sheet 30, and held by slider 20, so that electrostatic sensor 40 has an orientation substantially parallel to the Z-Y plane. Therefore, in the present embodiment, since electrostatic sensor 40 can detect the slide operation of the operating body, which is the trace operation described above, a portion that holds electrostatic sensor 40 is also referred to as slider 20.

Electrostatic sensor 40 is a sensor capable of detecting the contact position of the operating body on operation surface 2. Electrostatic sensor 40 is electrically connected to circuit substrate 60. Accordingly, when detecting an operation performed on operation surface 2 by the operating body, electrostatic sensor 40 outputs a detection result to controller 65, in circuit substrate 60, which is illustrated in FIG. 6.

Panel 50 covers electrostatic sensor 40, light diffusion sheet 30, and slider 20, and is fixed to slider 20 to have an orientation substantially parallel to the Z-Y plane. Panel 50 has a framework shape forming opening portion 51. Light-transmissive component 52 is fitted in opening portion 51. Light-transmissive component 52 forms operation surface 2 on the surface on the X-axis positive direction side. Opening portion 51 and light-transmissive component 52 are located on the surface of panel 50 to face electrostatic sensor 40. This enables electrostatic sensor 40 to detect an operation performed on operation surface 2 by the operating body.

Circuit substrate 60 is disposed on the surface of main body 10 on the X-axis negative direction side and is coupled to main body 10, so that circuit substrate 60 has an orientation substantially parallel to the Z-Y plane. Light sources 61 and controller 65 illustrated in FIG. 6 and configured by a processor or the like are mounted on circuit substrate 60. Controller 65 can cause exciter 90 to output at least one of sound or vibration.

Holder 70 is a plate-like holding component for holding exciter 90. Holder 70 is disposed on the X-axis negative direction side of circuit substrate 60 to have an orientation substantially parallel to the Z-Y plane.

As illustrated in FIG. 4 and FIG. 5, holder 70 is coupled to slider 20 by first bolts 81. Specifically, with first bolt 81, which penetrates insertion hole 71 formed in holder 70, being fastened to coupling portion 21 of slider 20 penetrated by insertion hole 12 formed in main body 10 and insertion hole 63 of circuit substrate 60, holder 70 is coupled to slider 20 by first bolt 81. With slider 20 and holder 70 being thus coupled together by first bolt 81, slider 20 and holder 70 are integrally fixed. First bolts 81 are included in the components of input device 1.

In the present embodiment, four corners of holder 70 are coupled to slider 20 by four first bolts 81, as illustrated in FIG. 2. The number of locations at which holder 70 is coupled to slider 20 and the number of first bolts 81 are not limited to four and may be, for example, three or less, or five or more.

As illustrated in FIG. 4 and FIG. 5, one end of leaf spring 80 that is elongated is interposed between first bolt 81 and insertion hole 71 of holder 70. One end of leaf spring 80 is coupled to first bolt 81 and holder 70, and is disposed to have an orientation substantially parallel to operation surface 2.

The other end of leaf spring 80 is coupled to main body 10 by second bolt 82. Specifically, with second bolt 82 being fastened to coupling portion 14 of main body 10 penetrated by insertion hole 62 formed in circuit substrate 60, the other end of leaf spring 80 is coupled to main body 10 by second bolt 82. In other words, leaf spring 80 is connected to holder 70 and main body 10. Second bolt 82 is included in the components of input device 1.

In the present embodiment, four leaf springs 80 are coupled to holder 70 so as to correspond one-to-one to four first bolts 81 and correspond one-to-one to four coupling portions 14 in main body 10 by four second bolts 82. The number of first bolts 81 and the number of second bolts 82 are not limited to four and may be, for example, three or less, or five or more.

Exciter 90 can output at least one of sound or vibration by being controlled by controller 65 illustrated in FIG. 6.

Exciter 90 is disposed on the X-axis positive direction side of holder 70 to have an orientation substantially parallel to the Z-Y plane. Exciter 90 is coupled to holder 70 by three third bolts 83 so that exciter 90 is integrally fixed to holder 70. Third bolts 83 are included in the components of input device 1. The number of third bolts 83 is not limited to three, and may be four or more, or two or less.

In this way, main body 10, circuit substrate 60, and cover 11 are integrally fixed. Thus, main body 10, circuit substrate 60, and cover 11 form a fixed portion in input device 1.

Moreover, exciter 90 and holder 70 are integrally fixed by third bolts 83, and holder 70 and slider 20 are integrally fixed by first bolts 81. Light diffusion sheet 30 and electrostatic sensor 40 are held by slider 20, and panel 50 is fixed to slider 20. Thus, exciter 90, holder 70, slider 20, light diffusion sheet 30, electrostatic sensor 40, and panel 50 form a movable portion in input device 1.

The fixed portion is a part that is fixed to the vehicle. The movable portion, in contrast, is a part that is movable by vibration of exciter 90. Specifically, spaces are formed between (i) insertion hole 12 formed in main body 10 and insertion hole 63 of circuit substrate 60, and (ii) coupling portion 21 of slider 20. As described above, leaf spring 80 connects holder 70 and main body 10, i.e., connects the movable portion and the fixed portion. Accordingly, leaf spring 80 can allow vibration of the movable portion to the fixed portion caused by vibration of exciter 90.

Specifically, exciter 90 is mechanically connected to electrostatic sensor 40 and panel 50 via at least holder 70. In the present embodiment, exciter 90 is mechanically connected to electrostatic sensor 40 and panel 50 via holder 70 and slider 20. Accordingly, when controller 65 in FIG. 6 vibrates exciter 90, vibration is transmitted to electrostatic sensor 40 and panel 50 via holder 70 and slider 20. With this, when an operation is performed on operation surface 2 by the operating body, operation surface 2 vibrates so that the vibration can be transmitted to the operating body.

Next, the detailed functions of input device 1 will be described.

As illustrated in FIG. 3 and FIG. 6, controller 65 causes exciter 90 to output at least one of sound or vibration in accordance with an operation performed on operation surface 2 by the operating body.

Specifically, in the case of a push operation, controller 65 causes exciter 90 to output at least one of sound or vibration so that the G value of the sound or vibration is approximately 9 Gpp, the frequency of the vibration is from 200 Hz to 300 Hz, the time average sound pressure of the sound is from 40 dB to 60 dB, and the frequency of the sound is from 2 kHz to 5 kHz.

The vibration frequency may be around 250 Hz depending on the frequency characteristics of sensory receptors of a user, and enhancement in the operation awareness of the user can be expected. When the time average sound pressure is from 40 dB to 60 dB, the user can hear sound and is less likely to feel uncomfortable. When the sound frequency is from 2 kH to 5 kH, since the range of the sound frequency is a frequency range with high hearing sensitivity according to an equal loudness contour indicating hearing characteristics of the user, enhancement in the operation awareness of the user can be expected.

In the case of a swipe operation, controller 65 causes exciter 90 to output at least one of sound or vibration so that the G value of the sound or vibration is approximately 4 Gpp, the frequency of the vibration is from 200 Hz to 300 Hz, the time average sound pressure of the sound is from 40 dB to 60 dB, and the frequency of the sound is from 2 kHz to 5 kHz.

In the case of a flick operation, controller 65 causes exciter 90 to output sound so that the time average sound pressure of the sound is from 40 dB to 60 dB and the frequency of the sound is from 2 kHz to 5 kHz. In the case of a flick operation, since the operating body moves away from operation surface 2, a G value and a vibration frequency are not set.

Controller 65 causes exciter 90 to output at least one of sound or vibration based on a signal in accordance with the detection performed by electrostatic sensor 40 and a signal in accordance with the detection performed by pressure detector 41.

Pressure detector 41 can detect pressure applied to operation surface 2 by the operating body. In other words, pressure detector 41 can detect a push operation. Pressure detector 41 may include holder 70 and circuit substrate 60 illustrated in FIG. 4. A pressure sensor capable of detecting pressure may be provided separately as pressure detector 41 in input device 1. In this case, since the movable portion moves when the operating body presses operation surface 2, pressure detector 41 may detect pressure from the operating body to operation surface 2 in accordance with a movable distance between holder 70 and circuit substrate 60 by detecting the movable distance by, for example, a change in electrostatic capacitance.

As illustrated in FIG. 7, controller 65 outputs, to exciter 90, a combined signal obtained by superimposing a first vibration signal and a first sound signal that is a control signal for causing exciter 90 to output sound, to cause exciter 90 to output sound and vibration. In other words, controller 65 causes exciter 90 to output sound and vibration using a combined signal obtained by superimposing a first sound signal and a first vibration signal that is preset based on a signal in accordance with detection performed by electrostatic sensor 40 and a signal in accordance with detection performed by pressure detector 41. For example, controller 65 causes exciter 90 to output different sounds and vibrations at the same time in accordance with a push operation, a swipe operation, and a flick operation. In FIG. 7, the horizontal axis indicates time and the vertical axis indicates the relative intensity of a vibration signal waveform.

As illustrated in (a) in FIG. 8, after outputting, to exciter 90, a first vibration signal that is a control signal for causing exciter 90 to output vibration, controller 65 can output a second vibration signal that is a control signal having the inverted phase of the phase of the first vibration signal. In other words, after inputting an input signal that is a first vibration signal to exciter 90, controller 65 can also input an input signal that is a second vibration signal to exciter 90. The control signal with the inverted phase is a signal for converging the vibration of the movable portion. Controller 65 outputs a second vibration signal to exciter 90 at an appropriate timing after outputting a first vibration signal to exciter 90, so as not to increase the intensity of the vibration of the movable portion. This timing may be preset.

For example, after inputting a one-pulse control signal to exciter 90, controller 65 additionally inputs a control signal having the inverted phase of the phase of the one-pulse control signal.

This enables controller 65 to cause exciter 90 to give the vibration of the inverted phase to the movable portion that vibrates by this one-pulse control signal. The vibration of the inverted phase output from exciter 90 works to negate the vibration of the movable portion, and the convergence time of the vibration in the movable portion can be reduced.

Although controller 65 inputs a control signal having an inverted phase corresponding to only a half of a wavelength to exciter 90, the present disclosure is not limited to this. Controller 65 may input a control signal having an inverted phase corresponding to at least one wavelength to exciter 90 to converge earlier the vibration of the movable portion.

For example, when controller 65 inputs a first vibration signal having just a basic waveform to exciter 90, as illustrated in (a) in FIG. 9, it takes 29.06 (ms) for the G value of the vibration of the movable portion to be a predetermined value or less, as illustrated in (b) in FIG. 9. The predetermined value here is set to a degree at which the user does not feel any vibration.

For example, when controller 65 inputs a second vibration signal including a control signal with an inverted phase to exciter 90, as illustrated in (a) in FIG. 8, it requires 19.7 (ms) for the G value of the vibration of the movable portion to be a predetermined value or less, as illustrated in (b) in FIG. 8. It is possible to reduce more the convergence time of the vibration in the movable portion by adding a control signal with an inverted phase, compared with when a control signal with an inverted phase is not added.

As illustrated in FIG. 3 and FIG. 6, controller 65 can cause exciter 90 to output vibration to reduce the intensity of vibration to be output from exciter 90 when electrostatic sensor 40 detects a trace operation (a swipe operation) on operation surface 2 to be less than the intensity of vibration to be output when pressure detector 41 detects pressure applied to operation surface 2. For example, controller 65 reduces more the vibration of the movable portion which is added when a swipe operation is performed, compared with when a push operation is performed. This can inhibit degradation in the feeling of operation in performing a swipe operation.

Controller 65 can also cause exciter 90 to reduce a period in which controller 65 causes exciter 90 to output sound when electrostatic sensor 40 detects a trace operation on operation surface 2 to be shorter than a period in which controller 65 causes exciter 90 to output sound when pressure detector 41 detects pressure applied to operation surface 2. For example, controller 65 reduces a period of sound to be output from exciter 90 when a swipe operation or a flick operation is performed to be shorter than a period of sound to be output from exciter 90 when a push operation is performed.

When a trace operation is performed on operation surface 2 and electrostatic sensor 40 detects that a trace operation has ended, controller 65 can also cause exciter 90 to output sound while causing exciter 90 to stop outputting vibration. For example, when it is detected that a trace operation has ended, controller 65 causes exciter 90 to stop outputting vibration since the operating body is distant from operation surface 2. When the operating body is distant from operation surface 2 after finishing a trace operation on operation surface 2, controller 65 causes exciter 90 to output sound to give the user a feeling of operation.

Controller 65 can also cause exciter 90 to reduce the pressure of sound to be output from exciter 90 when electrostatic sensor 40 detects a trace operation on operation surface 2 to be less than the pressure of sound to be output from exciter 90 when pressure detector 41 detects pressure applied to operation surface 2. For example, controller 65 reduces the pressure of sound to be output from exciter 90 when a swipe operation or a flick operation is performed to be less than the pressure of sound to be output from exciter 90 when a push operation is performed.

Controller 65 can also cause exciter 90 to increase the frequency of sound to be output from exciter 90 when electrostatic sensor 40 detects a trace operation on operation surface 2 to be higher than the frequency of sound to be output from exciter 90 when pressure detector 41 detects pressure applied to operation surface 2. For example, controller 65 increases the frequency of sound to be output from exciter 90 when a swipe operation or a flick operation is performed to be higher than the frequency of sound to be output from exciter 90 when a push operation is performed.

When the frequency of sound to be output from exciter 90 includes a plurality of frequencies, controller 65 increases the frequency of sound to be output from exciter 90 with a sound average frequency serving as a reference. Specifically, controller 65 causes exciter 90 to increase the average frequency of sound to be output from exciter 90 when a trace operation is performed on operation surface 2 to be higher than the average frequency of sound to be output from exciter 90 when operation surface 2 is pressed.

Controller 65 can cause exciter 90 to output only vibration when electrostatic sensor 40 detects a contact to operation surface 2 or when pressure detector 41 detects pressure applied to operation surface 2. For example, controller 65 causes exciter 90 to output only vibration while the operating body is contacting operation surface 2 during a push operation or a swipe operation.

When controller 65 is causing exciter 90 to output vibration and electrostatic sensor 40 detects that an operation on operation surface 2 has ended, controller 65 can also cause exciter 90 to stop outputting vibration and output sound. For example, when the end of a push operation or a swipe operation is detected, controller 65 causes exciter 90 to stop outputting vibration. When the operating body is distant from operation surface 2 after finishing a push operation, a swipe operation, or a flick operation, controller 65 causes exciter 90 to output sound to give the user a feeling of operation.

When electrostatic sensor 40 detects that the operating body is gradually moving away from operation surface 2 after finishing an operation on operation surface 2, controller 65 can also cause exciter 90 to change sound to be output from exciter 90, in accordance with the distance between the operating body and operation surface 2. When the operating body is distant from operation surface 2 after finishing a push operation, a swipe operation, or a flick operation, for example, controller 65 reduces the volume or pressure of sound to be output from exciter 90 as the distance gradually increases, so as to give the user a feeling of operation. Also in this case, controller 65 causes exciter 90 to stop outputting vibration.

When the operating body is not contacting operation surface 2, controller 65 is causing exciter 90 to output sound, and electrostatic sensor 40 detects that the operating body has contacted operation surface 2, controller 65 can also cause exciter 90 to stop outputting sound and output vibration. For example, when the operating body approaches operation surface 2 to start a push operation or a swipe operation, controller 65 causes exciter 90 to output sound until the operating body contacts operation surface 2, to give the user a feeling of operation. When the operating body contacts operation surface 2, controller 65 causes exciter 90 to stop outputting sound and output vibration.

When the operating body is not contacting operation surface 2 and electrostatic sensor 40 detects that the operating body is gradually approaching operation surface 2, controller 65 can cause exciter 90 to change sound to be output from exciter 90, in accordance with the distance between the operating body and operation surface 2. For example, when the operating body approaches operation surface 2 to start a push operation, a swipe operation, or a flick operation, controller 65 increases sound to be output from exciter 90 as the distance gradually decreases, to give the user a feeling of operation.

Advantageous Effects

Next, advantageous effects of input device 1 according to the present embodiment will be described.

With the use of a conventional pressure-sensitive haptic human machine interface, when an acoustic actuator is used in an actuator, mechanical vibration and auditory output can be both provided at the same time, but no countermeasures are taken for providing mechanic vibration and auditory output based on what kind of operation is performed on an operation surface.

In view of this, input device 1 according to the present embodiment is to be provided in a vehicle and includes: electrostatic sensor 40 that detects the contact position of an operating body on operation surface 2; pressure detector 41 that detects pressure applied to operation surface 2; exciter 90 that vibrates operation surface 2; and controller 65. Controller 65 causes exciter 90 to output at least one of sound or vibration based on a signal in accordance with the detection performed by electrostatic sensor 40 and a signal in accordance with the detection performed by pressure detector 41.

According to the above feature, with the operating body performing an operation on operation surface 2, controller 65 causes exciter 90 to output at least one of sound or vibration, and at least one of sound or vibration is output in accordance with the operation performed on operation surface 2.

It is therefore possible to allow the user sensory perception of what kind of operation is performed on operation surface 2.

In input device 1 according to the present embodiment, after controller 65 outputs, to exciter 90, a first vibration signal that is a control signal for causing exciter 90 to output vibration, controller 65 outputs a second vibration signal that is a control signal having the inverted phase of the phase of the first vibration signal to exciter 90.

According to the above feature, since exciter 90 receives an input of the second vibration signal with the inverted phase to negate vibration that has been output by exciter 90 based on the first vibration signal, this works to negate the vibration of the movable portion based on the first vibration signal. It is therefore possible to reduce the convergence time of the vibration in the movable portion based on the first vibration signal.

Particularly, even when a swipe operation is continuously performed on the input device, remaining vibration can be inhibited by the vibration of the movable portion being negated. It is therefore less likely to give the user a feeling of discomfort even when the user continuously performs a swipe operation.

In input device 1 according to the present embodiment, controller 65 outputs, to exciter 90, a signal obtained by superimposing a first vibration signal and a first sound signal, to cause exciter 90 to output sound and vibration, where the first vibration signal is a control signal for causing exciter 90 to output vibration, and the first sound signal is a control signal for causing exciter 90 to output sound.

According to the above feature, it is possible to cause exciter 90 to output sound and vibration at the same time. This allows the user to easily get sensory perception of a feeling of operation in operating input device 1.

In input device 1 according to the present embodiment, controller 65 causes exciter 90 to output vibration to reduce the intensity of vibration to be output from exciter 90 when electrostatic sensor 40 detects a trace operation to be less than the intensity of vibration to be output from exciter 90 when pressure detector 41 detects pressure applied to operation surface 2, where the trace operation is an operation of tracing operation surface 2.

For example, when the vibration of the movable portion which is added at the time of a swipe operation is large, the user may feel discomfort. However, the input device according to the present embodiment can reduce the vibration of the movable portion which is added at the time of a swipe operation to be less than the vibration of the movable portion which is added at the time of a press operation. It is thus possible not to degrade a feeling of operation at the time of a swipe operation.

In input device 1 according to the present embodiment, controller 65 causes exciter 90 to reduce a period in which controller 65 causes exciter 90 to output sound when electrostatic sensor 40 detects a trace operation to be shorter than a period in which controller 65 causes exciter 90 to output sound when pressure detector 41 detects pressure applied to operation surface 2, where the trace operation is an operation of tracing operation surface 2.

For example, since a trace operation requires a longer operation period than a press operation, exciter 90 may continuously output sound by a trace operation that is previously performed on operation surface 2. In this case, sound that is output from exciter 90 by the previous trace operation performed on operation surface 2 may overlap sound that is output from exciter 90 by the next trace operation performed on operation surface 2.

However, the input device according to the present embodiment allows sound that is output from exciter 90 by a trace operation previously performed on operation surface 2 not to overlap sound that is output from exciter 90 by the next trace operation performed on operation surface 2 because a period in which the sound of a trace operation is output is shorter than a period in which the sound of a push operation is output.

Particularly, by setting a sound frequency in a range from 2 kHz to 5 kHz, it is possible to give the user a more comfortable feeling of operation.

In input device 1 according to the present embodiment, when electrostatic sensor 40 detects that a trace operation of tracing operation surface 2 has ended, controller 65 causes exciter 90 to output sound while causing exciter 90 to stop outputting vibration.

According to the above feature, when the operating body moves away from operation surface 2 after finishing a trace operation on operation surface 2, controller 65 can cause exciter 90 to stop outputting vibration so that exciter 90 does not output unnecessary vibration.

When the operating body moves away from operation surface 2, controller 65 can cause exciter 90 to output sound. In other words, when the operating body is not contacting operation surface 2, controller 65 can cause exciter 90 not to output vibration and output sound. The user can therefore have a feeling of unity between an operation performed on operation surface 2 and sound in accordance with the operation.

In input device 1 according to the present embodiment, controller 65 causes exciter 90 to reduce pressure of sound to be output from exciter 90 when electrostatic sensor 40 detects a trace operation to be less than pressure of sound to be output from exciter 90 when pressure detector 41 detects pressure applied to operation surface 2, where the trace operation is an operation of tracing operation surface 2.

For example, since a trace operation requires a longer operation period than a press operation, the exciter may continuously output sound by a trace operation that is previously performed on the operation surface. In this case, sound that is output from the exciter by a trace operation previously performed on the operation surface may overlap sound that is output from the exciter by the next trace operation performed on the operation surface.

However, with the input device according to the present embodiment, the pressure of sound to be output from exciter 90 is smaller when a trace operation is performed on operation surface 2 than when a press operation is performed on operation surface 2. It is therefore possible to reduce a risk that sound that is output from exciter 90 by a trace operation previously performed on operation surface 2 sounds overlapping sound that is output from exciter 90 by the next trace operation performed on operation surface 2.

In input device 1 according to the present embodiment, controller 65 causes exciter 90 to increase the frequency of sound to be output from exciter 90 when electrostatic sensor 40 detects a trace operation to be higher than the frequency of sound to be output from exciter 90 when pressure detector 41 detects pressure applied to operation surface 2, where the trace operation is an operation of tracing operation surface 2.

According to the above feature, since the frequency of sound to be output from exciter 90 is higher when a trace operation is performed on operation surface 2 than when a press operation is performed on operation surface 2, sound is likely to be attenuated more when a trace operation is performed on operation surface 2. This therefore allows sound that is output from exciter 90 by a trace operation previously performed on operation surface 2 not to overlap sound that is output from exciter 90 by the next trace operation performed on operation surface 2.

In input device 1 according to the present embodiment, controller 65 causes exciter 90 to output only vibration when electrostatic sensor 40 detects a contact to operation surface 2 or when pressure detector 41 detects pressure applied to operation surface 2.

According to the above feature, exciter 90 can vibrate operation surface 2 while the operating body is contacting operation surface 2. The user can therefore actually feel an operation performed on operation surface 2 through the vibration of operation surface 2 while the operating body is contacting operation surface 2.

In input device 1 according to the present embodiment, when controller 65 is causing exciter 90 to output vibration and electrostatic sensor 40 detects that an operation performed on operation surface 2 has ended, controller 65 causes exciter 90 to stop outputting vibration and output sound.

According to the above feature, it is possible to cause exciter 90 to output vibration only while the operating body is contacting operation surface 2 and cause exciter 90 to stop outputting vibration and output sound when the operating body moves away from operation surface 2. Controller 65 thus causes exciter 90 to output either vibration or sound from the time of contact until the time of non-contact to operation surface 2, so that the user can have a feeling of unity between an operation performed on operation surface 2 and sound or vibration in accordance with the operation.

In input device 1 according to the present embodiment, when electrostatic sensor 40 detects that the operating body ends an operation on operation surface 2 and gradually moves away from operation surface 2, controller 65 causes exciter 90 to change sound to be output from exciter 90, in accordance with the distance between the operating body and operation surface 2.

According to the above feature, it is possible to inform, using sound, the user that the operating body is gradually moving away from operation surface 2.

In addition, sound to be output from exciter 90 is changed in accordance with the distance between the operating body and operation surface 2 so that the user can know that an operation performed on operation surface 2 ends.

In input device 1 according to the present embodiment, when the operating body is not contacting operation surface 2, controller 65 is causing exciter 90 to output sound, and electrostatic sensor 40 detects that the operating body has contacted operation surface 2, controller 65 causes exciter 90 to stop outputting sound and output vibration.

According to the above feature, it is possible to inform, using sound and vibration, the user that the state of the operating body on operation surface 2 changes from a non-contact state to a contact state.

In addition, while the operating body is contacting operation surface 2, the user can actually feel an operation performed on operation surface 2 through the vibration of operation surface 2.

In input device 1 according to the present embodiment, when the operating body is not contacting operation surface 2 and electrostatic sensor 40 detects that the operating body is gradually approaching operation surface 2, controller 65 causes exciter 90 to change sound to be output from exciter 90, in accordance with the distance between the operating body and operation surface 2.

According to the above feature, it is possible to inform, using sound, the user that the operating body is gradually approaching operation surface 2.

In addition, since sound to be output from exciter 90 is changed in accordance with the distance between the operating body and operation surface 2, it is possible to allow the user to know that an operation on operation surface 2 starts.

Input device 1 according to the present embodiment includes: main body 10; circuit substrate 60 fixed to main body 10; holder 70 that holds exciter 90; and leaf spring 80 that connects holder 70 and main body 10. Pressure detector 41 includes holder 70 and circuit substrate 60.

According to the above feature, since pressure detector 41 can be configured to detect a movable distance between holder 70 and circuit substrate 60 by a change in electrostatic capacitance, input device 1 may not need to separately include pressure detector 41 including a sensor capable of detecting pressure.

In input device 1 according to the present embodiment, exciter 90 is mechanically connected to electrostatic sensor 40 via at least holder 70.

According to the above feature, since the vibration of exciter 90 can be transmitted to electrostatic sensor 40, the vibration of exciter 90 can be also transmitted to operation surface 2. This allows the user to feel an operation performed on operation surface 2 through the vibration.

In input device 1 according to the present embodiment, leaf spring 80 is disposed to have an orientation parallel to operation surface 2.

According to the above feature, since an increase in the size of input device 1 can be inhibited, thinning of input device 1 can be expected.

Other Variations, Etc

Although the present disclosure has been described based on the embodiment, the present disclosure is not limited to the embodiment.

For example, elements including a controller included in the input device according to the embodiment are each realized as LSI that is typically an integrated circuit. Each of the elements may be separately integrated into one chip or some or all of the elements may be integrated into one chip.

The circuit integration is not limited to LSI and may be realized by a dedicated circuit or a general processor. A field programmable gate array (FPGA) that is programmable after manufacturing LSI or a reconfigurable processor with which connection and settings of circuit cells inside LSI are reconfigurable may be used.

In the embodiment, each of the elements may be configured by dedicated hardware or realized by executing a software program suitable for the element. Each of the elements may be realized by a program executor, such as a CPU or a processor, reading and executing the software program recorded in a recording medium such as a hard disk or a semiconductor memory.

All of numbers used in the embodiment are for illustrations for explaining the present disclosure in detail, and the embodiment of the present disclosure is not limited to the numbers indicated in the embodiment of the present disclosure.

Division of function blocks in a block diagram is one example and a plurality of function blocks can be realized as one functional block or one functional block may be divided into plural functional blocks or some functions may be moved to another functional block. A plurality of functional blocks having similar functions may be processed in parallel or time-shared by single hardware or software.

Other embodiments obtained by various modifications of the embodiment that may be conceived by persons skilled in the art, as well as embodiments resulting from combinations of elements and functions in the embodiment that do not depart from the essence of the present disclosure are also included in the present disclosure.

Supplementary Notes

Hereinafter, the features of the input device based on the embodiment will be described.

Technique 1

An input device to be provided in a vehicle, the input device comprising:

an electrostatic sensor that detects a contact position of an operating body on an operation surface;
a pressure detector that detects pressure applied to the operation surface;
an exciter that vibrates the operation surface; and
a controller, wherein
the controller causes the exciter to output at least one of sound or vibration based on a signal in accordance with the detection performed by the electrostatic sensor and a signal in accordance with the detection performed by the pressure detector.

Technique 2

The input device according to Technique 1, wherein
after the controller outputs, to the exciter, a first vibration signal that is a control signal for causing the exciter to output vibration, the controller outputs a second vibration signal that is a control signal having an inverted phase of a phase of the first vibration signal to the exciter.

Technique 3

The input device according to Technique 1 or 2, wherein
the controller outputs, to the exciter, a signal obtained by superimposing a first vibration signal and a first sound signal, to cause the exciter to output sound and vibration, the first vibration signal being a control signal for causing the exciter to output vibration, the first sound signal being a control signal for causing the exciter to output sound.

Technique 4

The input device according to any one of Techniques 1 to 3, wherein
the controller causes the exciter to output vibration to reduce an intensity of vibration to be output from the exciter when the electrostatic sensor detects a trace operation to be less than an intensity of vibration to be output from the exciter when the pressure detector detects pressure applied to the operation surface, the trace operation being an operation of tracing the operation surface.

Technique 5

The input device according to any one of Techniques 1 to 4, wherein
the controller causes the exciter to reduce a period in which the controller causes the exciter to output sound when the electrostatic sensor detects a trace operation to be shorter than a period in which the controller causes the exciter to output sound when the pressure detector detects pressure applied to the operation surface, the trace operation being an operation of tracing the operation surface.

Technique 6

The input device according to any one of Techniques 1 to 5, wherein
when the electrostatic sensor detects that a trace operation of tracing the operation surface has ended, the controller causes the exciter to output sound while causing the exciter to stop outputting vibration.

Technique 7

The input device according to any one of Techniques 1 to 6, wherein the controller causes the exciter to reduce pressure of sound to be output from the exciter when the electrostatic sensor detects a trace operation to be less than pressure of sound to be output from the exciter when the pressure detector detects pressure applied to the operation surface, the trace operation being an operation of tracing the operation surface.

Technique 8

The input device according to any one of Techniques 1 to 7, wherein the controller causes the exciter to increase a frequency of sound to be output from the exciter when the electrostatic sensor detects a trace operation to be higher than a frequency of sound to be output from the exciter when the pressure detector detects pressure applied to the operation surface, the trace operation being an operation of tracing the operation surface.

Technique 9

The input device according to any one of Techniques 1 to 8, wherein the controller causes the exciter to output only vibration when the electrostatic sensor detects a contact to the operation surface or when the pressure detector detects pressure applied to the operation surface.

Technique 10

The input device according to any one of Techniques 1 to 9, wherein when the controller is causing the exciter to output vibration and the electrostatic sensor detects that an operation on the operation surface has ended, the controller causes the exciter to stop outputting vibration and output sound.

Technique 11

The input device according to claim any one of Techniques 1 to 10, wherein when the electrostatic sensor detects that the operating body ends an operation on the operation surface and gradually moves away from the operation surface, the controller causes the exciter to change sound to be output from the exciter, in accordance with a distance between the operating body and the operation surface.

Technique 12

The input device according to any one of Techniques 1 to 11, wherein when the operating body is not contacting the operation surface, the controller is causing the exciter to output sound, and the electrostatic sensor detects that the operating body has contacted the operation surface, the controller causes the exciter to stop outputting sound and output vibration.

Technique 13

The input device according to any one of Techniques 1 to 12, wherein when the operating body is not contacting the operation surface and the electrostatic sensor detects that the operating body is gradually approaching the operation surface, the controller causes the exciter to change sound to be output from the exciter, in accordance with a distance between the operating body and the operation surface.

Technique 14

The input device according to any one of Techniques 1 to 13, comprising:

a main body;
a circuit substrate fixed to the main body;
a holder that holds the exciter; and
a leaf spring that connects the holder and the main body, wherein
the pressure detector includes the holder and the circuit substrate.

Technique 15

The input device according to Technique 14, wherein the exciter is mechanically connected to the electrostatic sensor via at least the holder.

Technique 16

The input device according to Technique 14 or 15, wherein the leaf spring is disposed to have an orientation parallel to the operation surface.

While an embodiment has been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims are incorporated herein by reference in their entirety: Japanese Patent Application No. 2023-107527 filed on Jun. 29, 2023.

The invention claimed is:

1. An input device to be provided in a vehicle, the input device comprising:
    an electrostatic sensor that detects a contact position of an operating body on an operation surface;
    a pressure detector that detects pressure applied to the operation surface;
    an exciter that vibrates the operation surface;
    a controller;
    a main body;
    a circuit substrate fixed to the main body;
    a holder that holds the exciter; and
    a leaf spring that connects the holder and the main body, wherein
    the pressure detector includes the holder and the circuit substrate, and
    the controller causes the exciter to output at least one of sound or vibration based on a signal in accordance with the detection performed by the electrostatic sensor and a signal in accordance with the detection performed by the pressure detector.

2. The input device according to claim 1, wherein after the controller outputs, to the exciter, a first vibration signal that is a control signal for causing the exciter to output vibration, the controller outputs a second vibration signal that is a control signal having an inverted phase of a phase of the first vibration signal to the exciter.

3. The input device according to claim 1, wherein the controller outputs, to the exciter, a signal obtained by superimposing a first vibration signal and a first sound signal, to cause the exciter to output sound and vibration, the first vibration signal being a control signal for causing the exciter to output vibration, the first sound signal being a control signal for causing the exciter to output sound.

4. The input device according to claim 3, wherein the controller causes the exciter to output vibration to reduce an intensity of vibration to be output from the exciter when the electrostatic sensor detects a trace operation to be less than an intensity of vibration to be output from the exciter when the pressure detector detects pressure applied to the operation surface, the trace operation being an operation of tracing the operation surface.

5. The input device according to claim 3, wherein the controller causes the exciter to reduce a period in which the controller causes the exciter to output sound when the electrostatic sensor detects a trace operation to be shorter than a period in which the controller causes the exciter to output sound when the pressure detector detects pressure applied to the operation surface, the trace operation being an operation of tracing the operation surface.

6. The input device according to claim 3, wherein when the electrostatic sensor detects that a trace operation of tracing the operation surface has ended, the controller causes the exciter to output sound while causing the exciter to stop outputting vibration.

7. The input device according to claim 3, wherein in case the electrostatic sensor detects a trace operation, the controller causes the exciter to reduce pressure of sound to be output from the exciter to be less than pressure of sound to be output from the exciter in case the pressure detector detects pressure applied to the operation surface, the trace operation being an operation of tracing the operation surface.

8. The input device according to claim 3, wherein in case the electrostatic sensor detects a trace operation, the controller causes the exciter to increase a frequency of sound to be output from the exciter to be higher than a frequency of sound to be output from the exciter in case the pressure detector detects pressure applied to the operation surface, the trace operation being an operation of tracing the operation surface.

9. The input device according to claim 1, wherein the controller causes the exciter to output only vibration when the electrostatic sensor detects a contact to the operation surface or when the pressure detector detects pressure applied to the operation surface.

10. The input device according to claim 9, wherein when the controller is causing the exciter to output vibration and the electrostatic sensor detects that an operation on the operation surface has ended, the controller causes the exciter to stop outputting vibration and output sound.

11. The input device according to claim 10, wherein when the electrostatic sensor detects that the operating body ends an operation on the operation surface and gradually moves away from the operation surface, the controller causes the exciter to change sound to be output from the exciter, in accordance with a distance between the operating body and the operation surface.

12. The input device according to claim 10, wherein when the operating body is not contacting the operation surface, the controller is causing the exciter to output sound, and the electrostatic sensor detects that the operating body has contacted the operation surface, the controller causes the exciter to stop outputting sound and output vibration.

13. The input device according to claim 10, wherein when the operating body is not contacting the operation surface and the electrostatic sensor detects that the operating body is gradually approaching the operation surface, the controller causes the exciter to change sound to be output from the exciter, in accordance with a distance between the operating body and the operation surface.

14. The input device according to claim 1, wherein the exciter is mechanically connected to the electrostatic sensor via at least the holder.

15. The input device according to claim 1, wherein the leaf spring is disposed to have an orientation parallel to the operation surface.

16. An input device to be provided in a vehicle, the input device comprising:
an electrostatic sensor that detects a contact position of an operating body on an operation surface;
a pressure detector that detects pressure applied to the operation surface;
an exciter that vibrates the operation surface; and
a controller, wherein
the controller causes the exciter to output at least one of sound or vibration based on a signal in accordance with the detection performed by the electrostatic sensor and a signal in accordance with the detection performed by the pressure detector, and
in case the electrostatic sensor detects a trace operation, the controller causes the exciter to reduce pressure of sound to be output from the exciter to be less than pressure of sound to be output from the exciter in case the pressure detector detects pressure applied to the operation surface, the trace operation being an operation of tracing the operation surface.

17. The input device according to claim 16, wherein the controller outputs, to the exciter, a signal obtained by superimposing a first vibration signal and a first sound signal, to cause the exciter to output sound and vibration, the first vibration signal being a control signal for causing the exciter to output vibration, the first sound signal being a control signal for causing the exciter to output sound.

18. An input device to be provided in a vehicle, the input device comprising:
an electrostatic sensor that detects a contact position of an operating body on an operation surface;
a pressure detector that detects pressure applied to the operation surface;
an exciter that vibrates the operation surface; and
a controller, wherein the controller causes the exciter to output at least one of sound or vibration based on a signal in accordance with the detection performed by the electrostatic sensor and a signal in accordance with the detection performed by the pressure detector, and in case the electrostatic sensor detects a trace operation, the controller causes the exciter to increase a frequency of sound to be output from the exciter to be higher than a frequency of sound to be output from the exciter in case the pressure detector detects pressure applied to the operation surface, the trace operation being an operation of tracing the operation surface.

19. The input device according to claim 18, wherein the controller outputs, to the exciter, a signal obtained by superimposing a first vibration signal and a first sound signal, to cause the exciter to output sound and vibration, the first vibration signal being a control signal for causing the exciter to output vibration, the first sound signal being a control signal for causing the exciter to output sound.

\* \* \* \* \*